United States Patent [19]

Sember, III et al.

[11] Patent Number: 5,069,837

[45] Date of Patent: Dec. 3, 1991

[54] METHOD OF FORMING INFLATABLE UPHOLSTERED CUSHION

[76] Inventors: Joseph A. Sember, III, 2339 Paseo de Cima; Joseph A. Sember, 2134 Camino San Rafael, both of Glendale, Calif. 91206

[21] Appl. No.: 490,038

[22] Filed: Mar. 7, 1990

Related U.S. Application Data

[63] Continuation-in-part of Ser. No. 226,664, Aug. 1, 1988, abandoned.

[51] Int. Cl.⁵ .............................................. B29C 67/22
[52] U.S. Cl. ................................. 264/45.2; 264/46.5; 264/46.6; 264/271.1; 264/275; 264/278
[58] Field of Search ............... 264/275, 277, 278, 46.4, 264/46.5, 46.6, 46.7, 45.2, 271.1

[56] References Cited

U.S. PATENT DOCUMENTS

| | | | |
|---|---|---|---|
| 2,822,554 | 2/1958 | Wenzelberger | 5/337 |
| 2,942,281 | 6/1960 | Cole | 5/341 |
| 3,242,511 | 3/1966 | Fultz | 5/348 |
| 3,932,252 | 1/1976 | Woods | 264/46.6 |
| 3,971,112 | 7/1976 | Amato et al. | 264/46.8 |
| 4,144,296 | 3/1979 | Dickens | 264/46.5 |
| 4,345,348 | 8/1982 | Hall | 5/450 |
| 4,377,609 | 3/1983 | Bartoli et al. | 264/46.6 |
| 4,501,034 | 2/1985 | Greenawalt | 5/441 |
| 4,787,106 | 11/1988 | Paxon | 5/432 |
| 4,789,202 | 12/1988 | Alter | 297/284 |
| 4,807,931 | 2/1929 | Ishida et al. | 297/284 |
| 4,873,036 | 10/1989 | Urai | 264/46.6 |
| 4,891,081 | 1/1990 | Takahashi et al. | 264/46.6 |
| 4,975,229 | 12/1990 | Kita et al. | 264/46.6 |

Primary Examiner—Robert A. Dawson
Assistant Examiner—Allan R. Kuhns
Attorney, Agent, or Firm—Lynn & Lynn

[57] ABSTRACT

A seat back or seat bottom cushion incorporates one or more inflatable/deflatable air chamber bladders. The cushions are integrally formed with the bladders by suspending the bladders in a clam shell type mold and then injecting chemicals in the mold to form a urethane foam or the like. The cushion resulting from the molds may include the outer upholstery covering as part of the molded assembly. Each bladder molded into the cushion has a port that permits passage of air into or out of the bladder.

4 Claims, 2 Drawing Sheets

METHOD OF FORMING INFLATABLE UPHOLSTERED CUSHION

This application is a continuation-in-part of Ser. No. 07/226,664, filed Aug. 1, 1988, now abandoned.

BACKGROUND OF THE INVENTION

This invention relates generally to cushions and particularly to seat cushions suitable for use in chairs, vehicle and aircraft seats. Still more particularly this invention relates to cushions that include one or more inflatable bladders.

Various types of inflatable seat and cushion constructions are currently employed to provide comfortable support for various sections of the body such as the lower back. To vary the amount of support to the lower back or to other parts of the seat occupant's body, inflatable/deflatable bladders are placed externally to the resilient foam of the cushion and connected to a manually operated pump and vent valve system or to an electric powered compressor and an electropneumatic switch/valve system. Such bladders may have one or more chambers that may be selectively inflated or deflated.

SUMMARY OF THE INVENTION

This invention provides means for a inflatable/deflatable bladder into foam thereby creating a completely integrated, self-contained cushion unit. One or more bladders are suspended in the cavity of a clam shell mold for making seat cushions. After the bladder is aligned to the desired orientation of the cushion, a foam is injected into the closed mold to form a cushion around the bladder. The cushion may include the outer upholstery covering as part of the molded assembly.

The integration of an inflatable/deflatable bladder with injected foam to form a cushion unit is an advancement in reliability, durability and cost effectiveness over the present placement of bladders external to the cushion unit.

The invention includes a method for forming a seat cushion, comprising the steps of forming a mold to have a cavity therein and mounting an inflatable/deflatable bladder in the mold. The method of the invention further includes the step of extending a tube from the bladder out of the mold so that the bladder can be selectively inflated or deflated after the cushion is formed. The method also includes the step of forming a resilient upholstered cushion surrounding the bladder in the cavity. The cushion may be formed by injecting into the mold chemicals that react to form a resilient foam material.

The method of the invention may also include the steps of forming the mold to include a pair of mold sections and mounting the bladder in the mold so that it is retained between the pair of sections. The method preferably also includes the steps of forming one of the mold sections to have a plurality of locator pins therein; forming a plurality of holes in a peripheral tab portion of the bladder to register with the locator pins; and mounting the bladder on the locator pins such that they extend through the holes. The method may further include the step of forming positioning stops on the locator pins to retain the bladder in a selected position in the mold so that the bladder is a predetermined position in the mold and in the cushion.

DESCRIPTION OF THE PREFERRED EMBODIMENT

Figure 1:
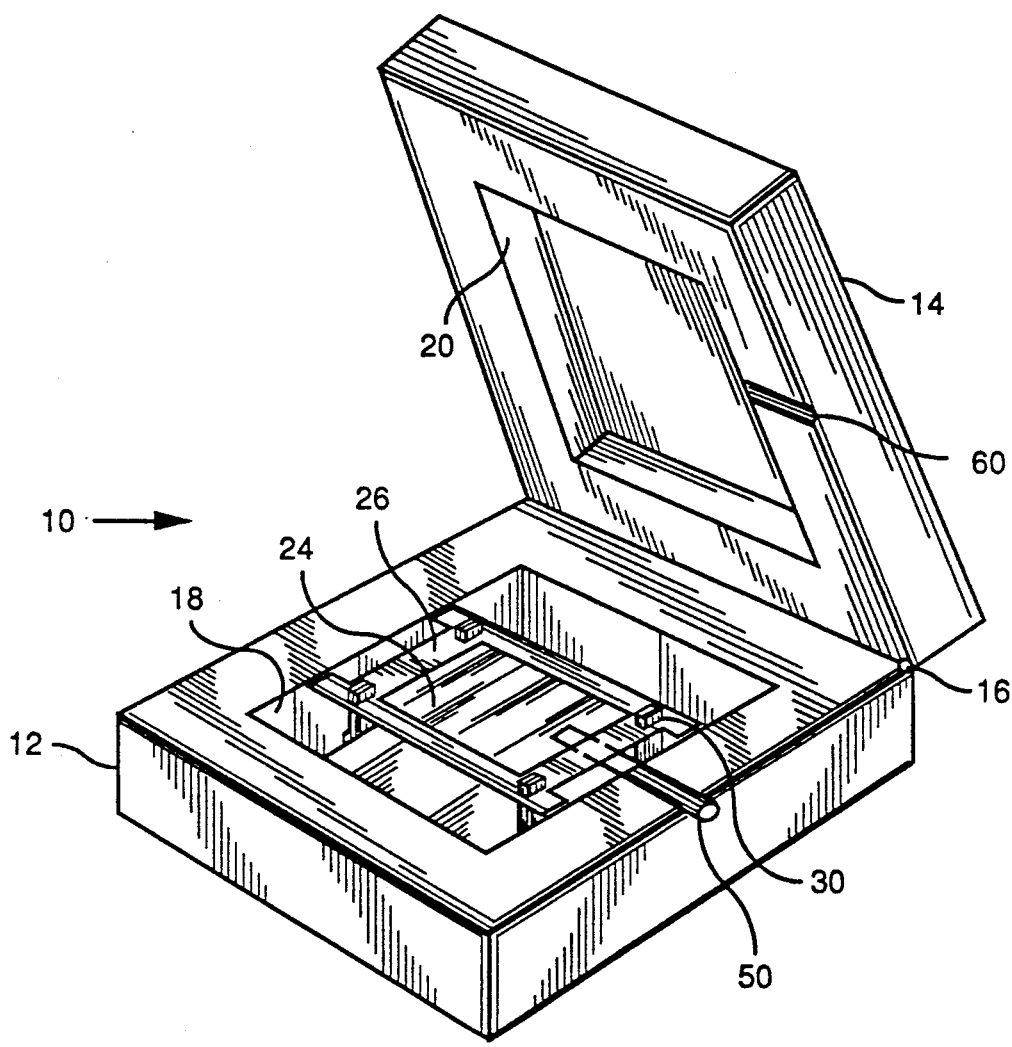
FIG. 1 is a perspective view of a mold and bladder arranged to form a seat cushion according to the present invention.
Figure 2:
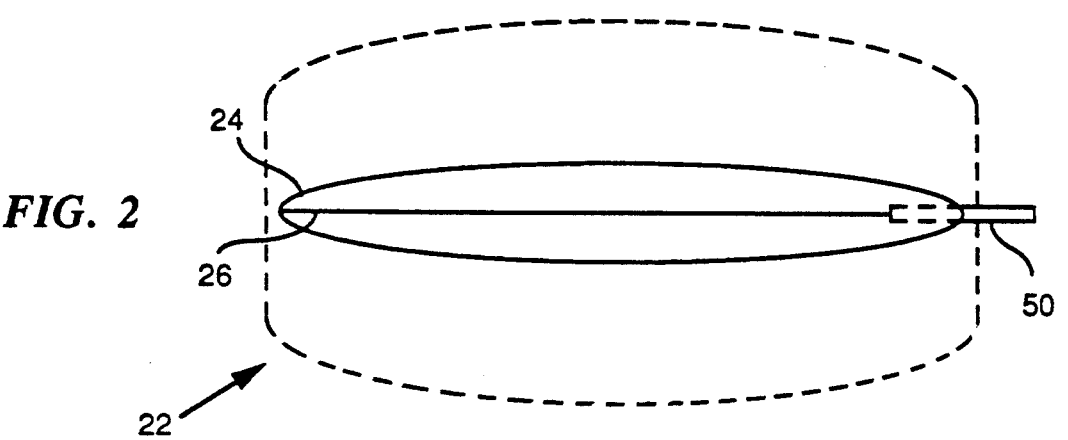
FIG. 2 illustrates a cushion formed according to the present invention.

FIG. 1 is a representation of a mold 10 that includes a first mold half 12 and a second half 14. For simplicity in illustrating the invention, the mold halves 12 and 14 are shown to have generally rectangular surfaces and cross sections. The mold halves 12 and 14 may be connected together by a hinge 16 to form a clamshell mold. The mold halves 12 and 14 may be formed of any suitable material such as steel or aluminum, for example. The mold halves 12 and 14 have cavities 18 and 20, respectively, formed therein. These cavities 18 and 20 are shown to be generally rectangular, but they may be any form that is desirable for forming a cushion 22 as shown in FIG. 2.

Figure 3:
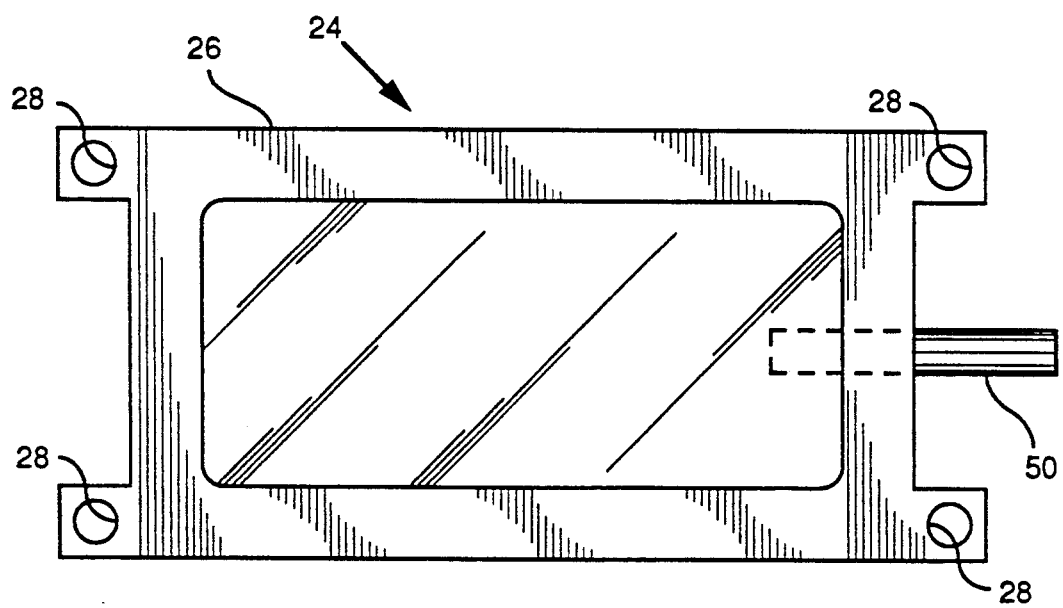
FIG. 3 is a plan view of the bladder shown in FIGS. 1 and 2.

Referring to FIG. 1, a bladder 24 is suspended across the cavity 18 of the mold half 12. Referring to FIGS. 1 and 3, the bladder 24 is formed of a pair of sheets of a flexible material that has high resistance to the passage of air or other gasses therethrough. The sheets are bonded or welded together around their edges to form a tab 26. The tab 26 may have a plurality of holes 28 formed therein around the periphery of the bladder 24.

Figure 4:
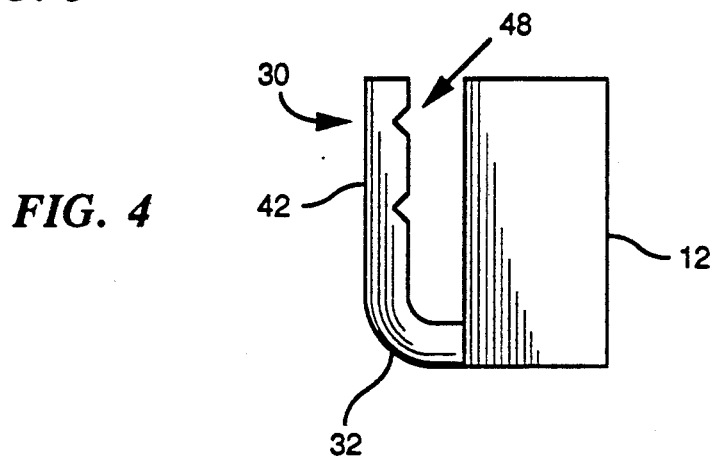
FIG. 4 illustrates a portion of the mold of FIG. 1 showing posts for attaching the bladder to the mold.

As shown in FIG. 1, the bladder 24 is suspended across the cavity 18 of the mold half 12 by registering the holes 28 in the bladder tab 26 with a plurality of posts 30 that extend from the mold half 12. FIG. 4 shows a portion of the mold half 12 with one of the posts 30 extending therefrom. A lower portion 32 of the post 30 is connected to the mold half 12. The post 30 has a portion 42 that extends generally parallel to an inner surface 46 of the mold half 12. The post portion 42 has positioning stops 48 thereon to engage the bladder tab 26. The depths of the cavities 18 and 20 of the two mold halves 12 and 14 and the positioning stops 48 on the posts 30 govern the position of the bladder 24 relative to the outer surface of the cushion formed from the reaction of the chemicals injected into the closed mold.

The bladder 24 includes an air passage tube 50 that extends out of the mold through a channel 60 in the mold half 14. When the mold half 14 of the mold 10 is closed on the mold half 12, the channel 6 in the mold half 14 registers with the air passage tube 50.

The mold halves 12 and 14 are then closed together and clamped securely. Chemicals well-known in the art for producing a foam cushion are then injected into the mold 10. After the chemicals have reacted, the resulting cushion contains the bladder integral therewith. The steps described above for making a foam cushion with an integral bladder may be repeated for any desired number of bladders to be included in the cushion. The mold 10 for forming a multiple bladder cushion must have a set of posts to mount each bladder and a channel for each air passage tube.

Referring to FIG. 2, the broken lines represent the cushion 22 formed around the bladder 24. The bladder 24 is shown to be partially inflated. The bladder 24 and the cushion 22 are not limited to the specific structures illustrated.

The cushion 22 may include the outer upholstery covering as part of the molded assembly. The front and back portions of the upholstery fabric may be placed in the corresponding halves 12 and 14 of the mold 10 and vacuum formed to make the upholstery conform to all the desired contours of the finished cushion. The inner surfaces of the sheets of cushion upholstery material may be coated with a material that will bond the foam to the upholstery material. The bladder 24 is then suspended in the mold as described above, and the mold is then closed. Chemicals are then injected to form the complete cushion 22, which comes out of the mold completely upholstered. The flash, or excess portions of the fabric, is trimmed off, and the cushion is then ready to be mounted into a shell (not shown), for example, to form the back of a seat for an automobile.

The structures illustrated are only examples selected to illustrate the principles of the present invention. Modifications to the illustrated embodiment may be made without departing from the spirit of the present invention. Therefore the present invention includes the subject matter defined by the appended claims and all reasonable equivalents.

What is claimed is:

1. A method for forming an upholstered seat cushion, comprising the steps of:
    forming a mold of a pair of mold sections such that when the mold is closed, the mold sections enclose a cavity;
    placing a sheet of cushion upholstery material in each of the mold sections such that an inner surface of the sheet faces away from a wall of the mold section containing the sheet;
    forming each sheet of cushion upholstery material to have the configuration of corresponding portions of the completed cushion;
    mounting an inflatable/deflatable bladder in the mold between the sheets of cushion upholstery material;
    inflating the bladder;
    injecting chemicals into the mold to form a foam material surrounding the inflated bladder and covered by the upholstery material;
    coating the inner surfaces of the sheets of cushion upholstery material with a material that will bond the foam to the upholstery material;
    forming one of the mold sections to have a plurality of locator pins therein;
    forming the bladder to have a tab portion;
    forming a plurality of holes in the tab portion to register with the locator pins;
    mounting the bladder on the locator pins such that the pins extend through the holes in the tab portion; and
    positioning the bladder in a selected position in the mold by using positioning stops on the locator pins to retain the bladder in a predetermined position in the cushion.

2. A method for forming an upholstered seat cushion, comprising the steps of:
    forming a mold that includes a pair of mold sections arranged such that when the mold is closed, the mold sections enclose a cavity;
    placing a sheet of cushion upholstery material in each of the mold sections such that an inner surface of the sheet faces away from a wall of the mold section containing the sheet;
    mounting an inflatable/deflatable bladder in the mold between the sheets of cushion upholstery material;
    injecting chemicals into the mold to form a foam material surrounding the bladder and covered by the upholstery material;
    forming one of the mold sections to have a plurality of locator pins therein;
    forming the bladder to have a tab portion;
    forming a plurality of holes in the tab portion to register with the locator pins;
    mounting the bladder on the locator pins such that the pins extend through the holes in the tab portion; and
    positioning the bladder in a selected position in the mold by using positioning stops on the locator pins to retain the bladder in a predetermined position in the cushion.

3. The method of claim 2, further including the step of inflating the bladder before injecting chemicals into the mold.

4. The method of claim 2, further including the step of coating the inner surfaces of the sheets of cushion upholstery material with a material that will bond the foam to the upholstery material.

* * * * *